W. GREENSLADE.
AUTO WHEEL ATTACHMENT.
APPLICATION FILED MAR. 25, 1921.
1,414,735.
Patented May 2, 1922.
2 SHEETS—SHEET 1.
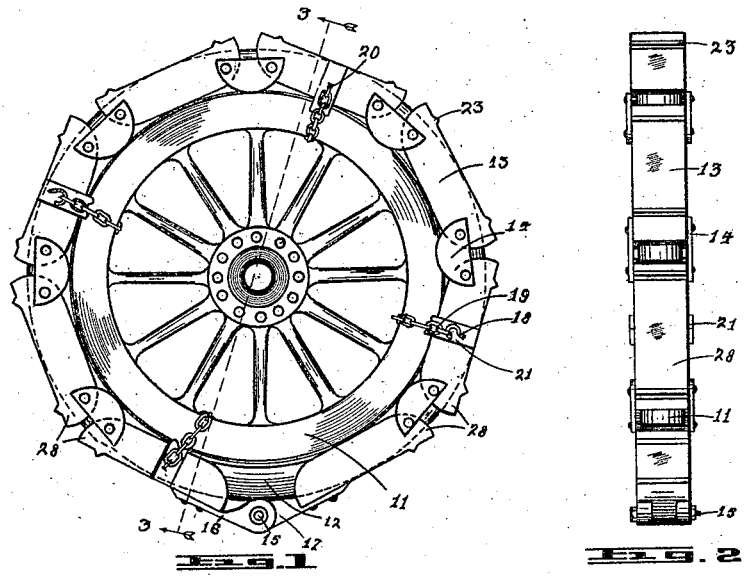
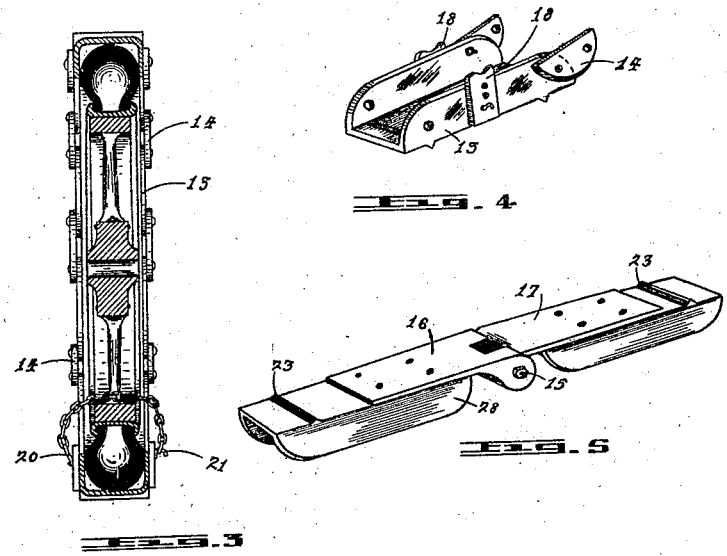

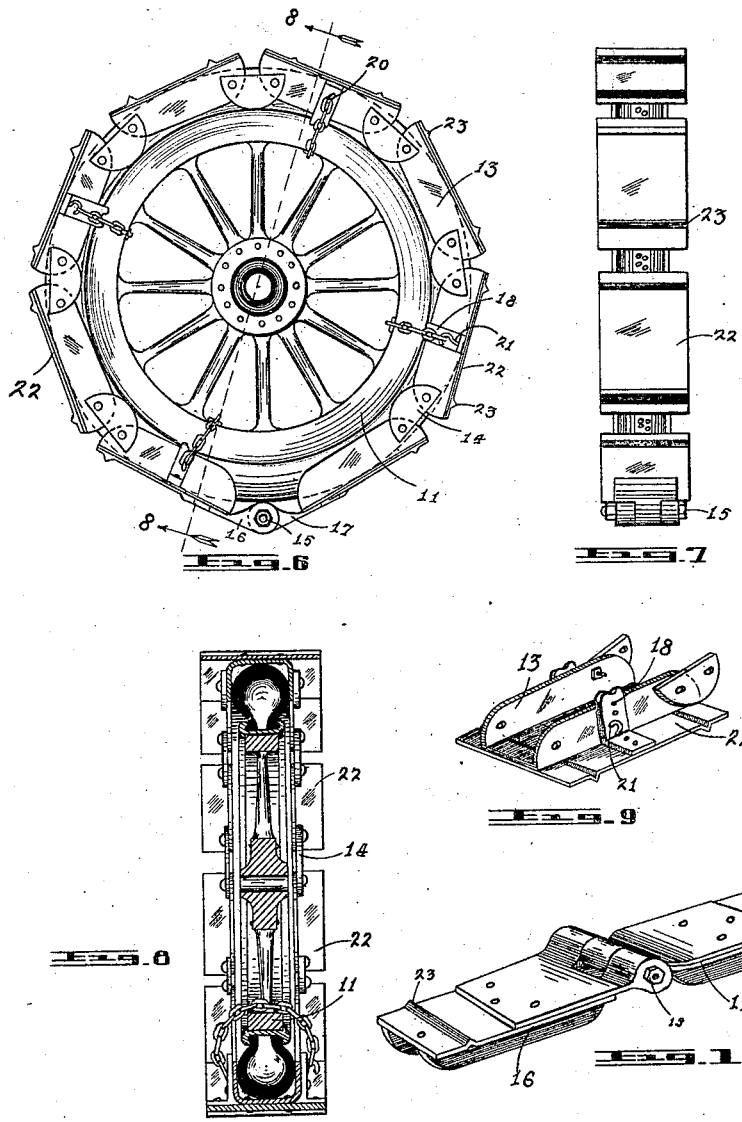

UNITED STATES PATENT OFFICE.

WILLIE GREENSLADE, OF OTTAWA, ONTARIO, CANADA.

AUTO WHEEL ATTACHMENT.

1,414,735. Specification of Letters Patent. Patented May 2, 1922.

Application filed March 25, 1921. Serial No. 455,479.

*To all whom it may concern:*

Be it known that I, WILLIE GREENSLADE, a citizen of the Dominion of Canada, residing at Ottawa, in the county of Carleton and Province of Ontario, Canada, have invented certain new and useful Improvements in Auto Wheel Attachments, of which the following is a specification.

The present invention relates to improvements in accessories for attachment to automobile wheels, and the principal object is to provide a device of the character described, which will enable the vehicle to proceed through tracts of mud, snow or the like.

A further object is to provide a device of the character described, which may be readily attached to the driving wheels of a vehicle.

With these and other objects in view, the invention consists in the construction, combination and arrangement of parts, as will be hereinafter fully described, illustrated in the accompanying drawings, and pointed out in the claims hereunto appended.

Figure 1 is a side elevation of an automobile wheel, embodying the preferred form of the present invention.

Figure 2 is a front elevation of the same.

Figure 3 is a vertical section on line 3—3 of Figure 1.

Figure 4 is an enlarged detailed perspective view of one of the tread shoe members.

Figure 5 is an enlarged detailed perspective view of the connection hinge members.

Figure 6 is a side elevation of an automobile wheel embodying a modified form of the present invention.

Figure 7 is a front elevation of the same.

Figure 8 is a vertical section on line 8—8 of Figure 6.

Figure 9 is an enlarged detailed perspective view of a modified form of one of the tread shoe members.

Figure 10 is an enlarged detailed perspective view of a modified form of the connection.

Referring to the drawings, like numerals designate like parts in the various drawings.

The numeral 11 indicates the felly of an automobile wheel on which is positioned the tire 12. Channel shaped shoe members 13 are disposed circumferentially on the tire, the ends of which are rounded to prevent binding. To suitably connect these channel shaped members, I provide segmental links 14, which are pivotally connected thereto. The device is connected by bolt 15 positioned in the hinge members 16 and 17, which are suitably connected to the channel shaped shoe members 13. Brackets 18, the upper ends of which are V-shaped, are suitably mounted on each alternate tread shoe member. Chains 19 are disposed around the felly to hold the device to the wheel. The said chains are connected on one side to eye members 20, and on the other by hooks 21, suitably connected to brackets 18, functioned to hold the said chains in position.

A plurality of V-shaped ridges 23 are configurated on the face of the channel shaped shoe members 13, to grip the surface of the road.

In the modified form of the invention, the construction is similar to that of the preferred form. Tread plate members 22 are substantially mounted on the channel shaped shoe members 13 to provide a greater traction surface upon the road. Members 22 have corresponding ridges to V-shaped ridges 23.

To position the tread member on the automobile wheel, it is first disposed circumferentially on the tire, and the chains hooked. The connection hinge is then engaged and fastened by the removable bolt 15 and nut.

It will be noticed in the drawings that the members 13 are spaced apart so that the ends have a clear cutting face 28 to engage the road when the wheel turns in either direction. This makes a positive gripping means.

From the foregoing, it is thought that the construction of my invention will be clearly understood, and, therefore, a more extended explanation has been omitted.

What I claim as new is:

1. An automobile accessory of the character described, comprising a plurality of channel-shaped shoe members adapted to circumferentially embrace a tire, segmental links pivotally connecting said members upon their inner portions, hinge members attached to adjacent shoe members upon their outer faces and pivotally connected together, brackets mounted on alternate shoe members and having V-shaped inner ends and chains engaged in said brackets.

2. An automobile accessory of the character described, comprising a plurality of channel-shaped shoe members adapted to circumferentially embrace a tire, segmental links pivotally connecting said members upon their inner portions, hinge members attached to adjacent shoe members upon their outer faces and pivotally connected together, brackets mounted on alternate shoe members and having V-shaped inner ends and chains engaged in said brackets, the acting faces of said shoe members having transverse gripping ridges.

In testimony whereof I affix my signature in the presence of two witnesses.

WILLIE GREENSLADE.

Witnesses:
R. SLONEMESKY,
M. MCMILLAN.